United States Patent [19]

Itoh

[11] Patent Number: 4,582,447
[45] Date of Patent: Apr. 15, 1986

[54] PLASTIC DISPLAY BUILDING DEVICE FOR CANS

[75] Inventor: Seiji Itoh, Yokohama, Japan

[73] Assignee: The Coca-Cola Company, Atlanta, Ga.

[21] Appl. No.: 506,039

[22] Filed: Jun. 20, 1983

[30] Foreign Application Priority Data

Feb. 18, 1983 [JP] Japan .................................. 58-24909

[51] Int. Cl.⁴ .............................................. B25G 3/00
[52] U.S. Cl. .................................. 403/305; 206/821; 229/DIG. 11; 403/300; 403/339; 403/361; 220/380; 446/125; 446/128
[58] Field of Search ............... 403/186, 300, 291, 361, 403/339; 229/DIG. 11; 206/821, 508, 159, 160, 161, 145, 146, 147, 511, 509, 512, 154; 220/380, 23.6; 46/17, 26, 29

[56] References Cited

U.S. PATENT DOCUMENTS

| | | | |
|---|---|---|---|
| 1,771,264 | 7/1930 | Marrits . | |
| 2,661,097 | 12/1953 | Paul . | |
| 2,665,807 | 1/1954 | Budd | 229/DIG. 11 |
| 2,912,139 | 11/1959 | Talley | 206/821 X |
| 2,957,601 | 10/1960 | Novick | 206/821 X |
| 3,180,537 | 4/1965 | Collins | 206/821 X |
| 3,250,564 | 5/1966 | Stern et al. | 206/821 |
| 3,317,087 | 5/1967 | Landis | 206/821 X |
| 3,422,564 | 1/1969 | Izumi | 206/821 X |
| 3,640,018 | 2/1972 | Light | 206/821 X |
| 3,815,281 | 6/1974 | Kander | 206/508 X |
| 4,076,123 | 2/1978 | Davis | 220/380 X |
| 4,120,396 | 10/1978 | Mascia et al. | 220/23.4 X |
| 4,308,952 | 1/1982 | Paulucci | 206/821 X |

FOREIGN PATENT DOCUMENTS 2118560 10/1972 Fed. Rep. of Germany .......... 46/26

Primary Examiner—Dennis L. Taylor
Attorney, Agent, or Firm—Birch, Stewart, Kolasch & Birch

[57] ABSTRACT

An adaptor structure for connecting a plurality of beverage cans together in selected configurations comprising a base plate with connector members on a first side thereof, a can-receiving socket on the opposite side thereof and spacer members within said socket. The cans have end recesses in which the spacer members seat when an adaptor is coupled to a can to form a strong, stable connection. Cans are assembled end-to-end with back-to-back adaptors at the end interfaces, the adaptors being connected to each other by the connector members.

22 Claims, 8 Drawing Figures

PLASTIC DISPLAY BUILDING DEVICE FOR CANS

BACKGROUND OF THE INVENTION

The present invention relates to adaptors for removably assembling many beverage cans into selected configurations. More particularly, the present invention relates to adaptors for removably assembling many such cans into configurations such as animal shapes or machines for display purposes in order to promote the sale of the contents of the cans.

Heretofore, some attempts have been made to provide adaptors for connecting a plurality of cans together in selected configurations to form toy animals or machinery such as in U.S. Pat. No. 3,422,564 to Izumi, issued Jan. 21, 1969.

Other attempts have been made to provide six-pack carriers for cans which facilitate stable stacking of a plurality of six packs, such as disclosed in U.S. Pat. No. 3,250,564 to Stern, et al., issued May 10, 1966 and U.S. Pat. No. 4,120,396 to Mascia et al., issued Oct. 17, 1978.

Other can stacking arrangements of the prior art are illustrated in the following U.S. Pat. Nos.: 1,771,264, to Marrits, issued July 22, 1930; 2,661,097, to Paul, issued Dec. 1, 1953; 2,957,601, to Novick, issued Oct. 25, 1960.

In spite of the attempts in the prior art to provide suitable can stacking adaptors, a need still exists for an improved adaptor which provides a stable and versatile coupling between adjacent cans to permit the creation of a wide variety of artistic configurations.

SUMMARY OF THE INVENTION

Accordingly, it is a primary object of the present invention to provide such a versatile and stable adaptor for a multiple can assembly.

Another object of the present invention is to provide adaptors with a receiving socket for the can ends and suitable connectors for securing adaptors to each other.

Still another object of the present invention is to provide adaptors which are easy to assemble and disassemble with respect to each other or associated can ends.

A still further object of the present invention is to provide adaptors suitable for use with either a two-piece can consisting of a main body with a bottom of a can produced as an integral structure by the usual extrusion method and a cover plate; or a three-piece can consisting of a main body, a separate bottom and a cover plate.

Still another object of the present invention is to provide adaptors suitable for assembly of selected multiple can configurations with a minimal distance between adjacent cans resulting in very natural appearing shapes.

According to the present invention, such objects and advantages of the present invention can be achieved by providing adaptors for removably assembling many cans in selected multiple can configurations, each of said adaptors comprising:

a base plate;

at least one projection extending from a first side of said base plate;

at least one spacing member provided in the base plate and having a connector hole for receiving the projection therein; and a skirt depending from said base plate forming a circular socket from said projection for receiving the top or bottom of a can therein, said spacing member extending beyond the thickness of the base plate to provide a space between the base plate and the top or bottom of the can when the can is fully inserted within said socket.

In a preferred embodiment, each adaptor is provided with a pair of projections which are diametrically disposed across the base plate and a pair of spacing members also diametrically disposed across the base plate. The two pairs are orthogonally disposed with respect to each other. The adaptors may be removably coupled together by the respective projections and holes in the spacing members and to can ends by the sockets.

The adaptors may be individual or integrally formed together in groups of six with peripheral edges connected together to receive six co-planar can ends in a six-pack configuration.

Selected multiple can configurations may be created by connecting combinations of both individual and/or said groups of adaptors to each other and to many associated cans. These configurations may include animals, vehicles or other machinery with distinctive and characteristic shapes and color combinations.

BRIEF DESCRIPTION OF THE DRAWINGS

The objects of the present invention and the attendant advantages thereof will become more readily apparent by reference to the following drawings wherein.

Hereinafter the adaptors of the present invention will be explained in detail with reference to FIGS. 1 to 8.

Figure 1:
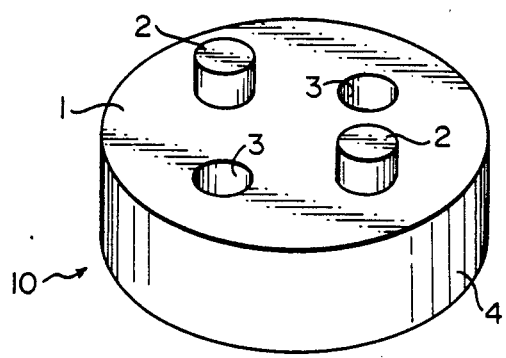
FIG. 1 is a perspective view of a first side of one form of an adaptor of the present invention.
Figure 2:
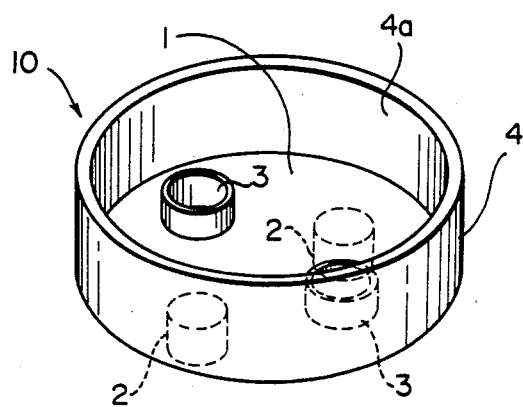
FIG. 2 is a perspective view of the opposite side of the adaptor of FIG. 1.
Figure 3C:
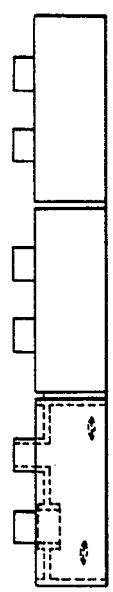
FIGS. 3a, 3b, 3c and 3d are top plan, bottom, front and side elevational views of six adaptors connected together in a six-pack configuration.
Figure 3D:
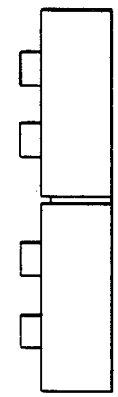
Figure 3A:
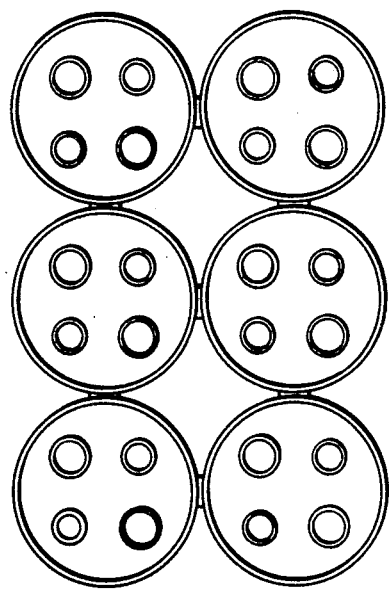
Figure 3B:
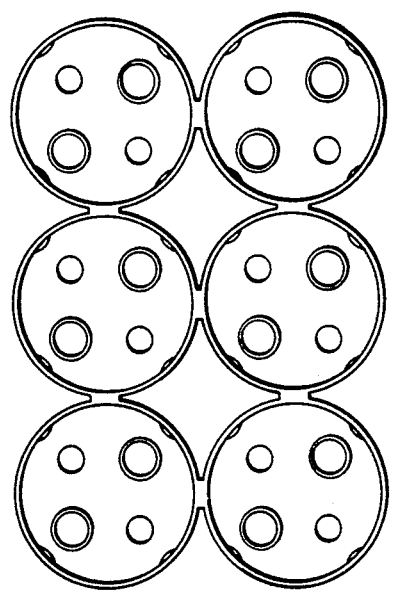

FIG. 1 is a perspective view of one embodiment of an adaptor of the present invention illustrating a first side of the adaptor which connects to a like side of another adaptor. FIG. 2 is a perspective view in which the can-receiving socket on the opposite side of the adaptor shown in FIG. 1 is illustrated.

The adaptors of the present invention include a base plate 1, a projection 2 extending from a first side of the base plate 1, a hole 3 in a spacing member provided in the base plate and a peripheral skirt 4 forming a circular inner peripheral wall 4a defining a socket on the opposite side of the base plate from the projections 2. The adaptors of the present invention receive either of the top or bottom ends of the can in the socket defined by the base plate 1 and the inner side wall 4a. This space will be referred to hereinafter as a can-receiving socket.

The projections 2 fit into the holes in the spacing members 3 of like adaptors in order to connect two adaptors together. Thus, it should be noted that two cans may be connected end-to-end by two adaptors of the present invention. Also, three cans may be connected by using two additional adaptors. The multiple adaptor array of the present invention, as illustrated in FIGS. 3a to 3d, may be used for connecting cans together in groups of six. FIG. 3 illustrates six adaptors integrally connected at the sidewalls in a six-pack configuration. Adaptor units may be similarly combined in optional numbers of 2, 3, 4 or in excess of 6, if similarly desired.

To use the adaptors of the present invention, the top or bottom ends of the can should have a rim which is higher than the end surfaces. Consequently, such a can will have an end recess between the top of the rim and the end surfaces. The adaptors of the present invention are provided with a construction to take advantage of this space for the connection of cans. That is, the adaptors of the present invention have spacing members extending beyond the thickness of the base plate in the can-receiving sockets. Accordingly, since each end of the can has a rim higher than the can end surface defining an end recess, the adaptor spacing members can seat in these end recesses when attached to a can.

Figure 4:
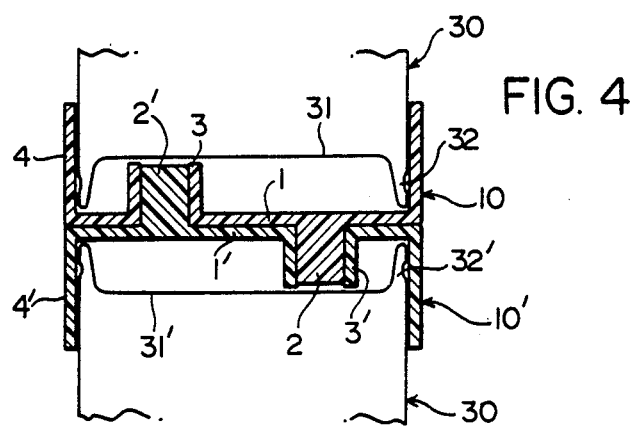
FIG. 4 is an exemplary interconnection of two can ends with adaptors of the type illustrated in FIGS. 1 and 2 thereon.

FIG. 4 schematically shows, in a cross-sectional view, the way two cans 30, 30' may be connected end-to-end by means of adaptors 10, 10' of the present invention. The projections 2 of the adaptor 10 fit into the holes of the spacing members 3' of the adaptor 10' and, on the contrary, the projections 2' of the adaptor 10' fit into the holes of the spacing members 3 of the adaptor 10. As FIG. 4 illustrates, the spacing members 3 of the adaptor 10 extend in the end recess of the can 30, defined by rim 32. Likewise, the holes of the spacing members 3' of the adaptor 10' extend into the end recess of the can 30' defined by rim 32'.

The adaptors of the present invention, because of the spacing members extending into the can end recesses, produce a strong connection while maintaining the distance between can ends as short as possible. By maintaining the distance between can ends as short as possible, it is possible for an assembled multiple can configuration with selected patterns and colors of the cans to give a natural appearance to viewers.

The adaptors of the present invention can be produced from polyolefins, such as polyethylene and polypropylene; polyesters, such as polyethylene terephthalate and polytetramethylene terephthalate; thermoplastic resins, such as 6-nylon, 6,6-nylon and 6,10-nylon; or thermosetting resins, such as epoxy resin. The adaptors of the present invention should preferably be integrally formed from the same matrial. However, they may have a sidewall, for instance, made of relatively hard paper and the other parts using the said resins as material, or these may be made from different resins as materials and physically and/or chemically combined and integrated by any known method.

The diameter of the circular inner peripheral wall 4a of the adaptor defining the can-receiving socket, of course, needs to be greater than that of the can rim. However, the size of the adaptors of the present invention may vary according to size of the cans to be connected. The number of projections and number of spacing members with holes therein and the positions thereof should be the same for adaptors to be connected together. The number of projections (and consequently holes) to be provided on one adaptor (adaptor unit) can be varied according to size or weight of the cans to be connected, and further, to the size of the final multiple can assembly. One of each of them at the minimum is needed for each adaptor unit, but it is preferred to have two of each. It is possible to have more than two, but if so, it becomes harder to smoothly fit and disassemble the adaptor units as the number of connecting elements increases. Two projections and holes per adaptor unit, for instance, will suffice for sufficient connection, if diameter of the can is of the order of about 5 to 7 cm, regardless of whether the can is an empty can, or a dummy can not filled, or a filled can.

It does not matter what sizes and forms the projections and connecting holes are, provided that they take complementary shapes. The shapes should preferably be circular. The size, in the case of a circle, should preferably have a radius on the order of about 6 to about 20 mm. Inner diameters of connecting holes should preferably be about 0.01 to about 0.1 mm larger than outer diameters of projections in order to facilitate a reasonably tight fit. The projections may be either solid or hollow. The height of the projections and the depth of the holes are regulated to some extent by size (depth) of the end recesses of the cans. Cans for cooling beverages or juices have end recesses usually on the order of about 4–6 mm in depth. The connecting members extending into the space from the base plate surface can be on the order of about 4 to 6 mm. By making them about 1 to 4 mm high, regardless of the kind of can end, these cans can be inserted into can-receiving sockets without any difficulty.

The height of the projections is regulated by the depth of the connecting holes and hence, it is desirable not to have a height capable of passing through the holes and beyond the ends of the spacing members.

The spacing members of the connecting holes should desirably have outwardly greatly enlarged inner walls on the projection sides, viz., in the terminal end on the side which receives the projection of another adaptor. It can be enlarged or flared outwardly at an angle of about 15 to 60 degrees. Further, for the same reason, the ends of the projections, viz., the part to first enter the connecting holes, should preferably have a tapered form. The tapered angle can be an angle of the same numerical value as the said enlarged angle of the connecting holes.

The inner sidewall 4a of the adaptor of the present invention must be circular because it is necessary to receive the can in the receiving socket. The form of the outer peripheral surface of skirt 4 is not critical for the adaptor of the present invention. However, by making the outer surface likewise circular, the thickness of the skirt 4 can be maintained constant and the amount of material used in the sidewall can be reduced.

The circular inner peripheral wall 4a of the first sidewall should preferably be slightly enlarged adjacent the base plate 1 in such a manner as to be able to readily receive the can. It will suffice to slant surface 4a on the order of about 15 to about 60 degrees outwardly from the peripendicular direction to the base plate. Preferably, the circular inner peripheral wall 4a should be greatly enlarged outwardly in the terminal end at the opening of the can-receiving socket. The degree of enlargement can be of the same order as the enlarged degree of the terminal end of the connecting holes.

The height of the sidewalls of the can-receiving sockets, viz., the height from the base plate surface to the terminal end of the wall (hereinafter called the depth of the receiving part) can be varied in various ways according to the can to be connected. For instance, for a can having a diameter on the order of about 5 to 7 cm, the depth of the receiving part can be set at about 10 to about 30 mm. Further, the thickness of the sidewall can be set at about 1 to about 3 mm. Due to the thickness of the sidewall and the depth of the receiving part, the cans can be securely assembled, and the presence of the sidewall in the assembled configuration is not readily noticeable to viewers.

In the case of the sidewall being made of transparent or semi-transparent resin material, they are even less noticeable. Of course, the adaptors of the present invention can be colored and by so doing they can be selected close to the color of the cans to be connected. It is also possible to accentuate the configuration formed by using adaptors of different colors from that of the cans.

Figure 5:
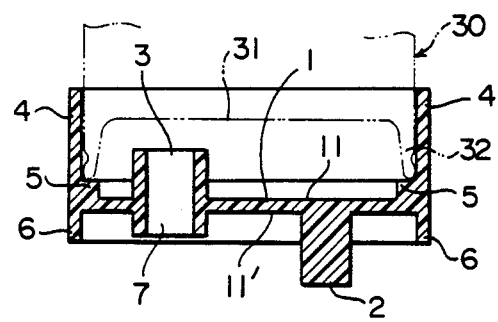
FIG. 5 is a cross-sectional view of another form of an adaptor for use with the present invention.

FIG. 5 shows a cross-sectional view of another preferred embodiment for the adaptors of the present invention. The adaptors of the present invention in FIG. 5 have a ledge 5 higher than the base plate surface 11 of the base plate 1 in the contact part of the base plate 1 with the first sidewall 4. The ledge 5 receives thereon the rim 32 of a can when receiving the can 30 in the can-receiving part. The presence of the ledge 5 makes a greater distance between the end of the can surface 31 and the base plate surface 11 of the adaptor, and because of this, it is possible to make the length of the connecting holes greater. Consequently, it is helpful for strengthening the connection between adaptors. The ledge 5 is also helpful for strengthening the connection between the base plate 1 and the sidewall 4 as well as for improving the physical strength of the adaptor. The ledge 5 should preferably be on the order of about 1 to about 3 mm high from the base plate surface 11. The ledge 5 can be continuous or intermittent, extending over the whole periphery of the contact part of the base plate with the circular inner peripheral wall of the sidewall 4.

The adaptors of the present invention may further have a second sidewall 6 having a lower height than that of the projection 2. The presence of the second sidewall 6 makes it easy to disassemble combined adaptors. The second sidewall should preferably form a circular outer peripheral wall. The second sidewall should not be as high from the other base plate surface 11' as is the first sidewall from the base plate 11. Its height should preferably be on the order of about 1 to about 3 mm. The presence of the second sidewall makes it possible to extend the connecting hole 3 to the side of the adaptor on which projection 2 is located, as indicated by number 7 in FIG. 5. The extension 7 of the connecting hole 3 should not be in excess of the height of the second sidewall from the base plate surface 11'.

Figure 6:
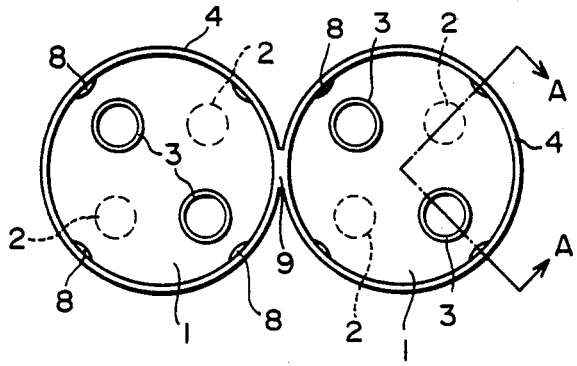
FIG. 6 is a bottom view of a double adaptor unit for use with the present invention.

FIG. 6 shows a plan view of another embodiment of the adaptors of the present invention in which two adaptor units 10, 10' are connected side-by-side. The adaptors in FIG. 6 have juts 8 slightly projecting from the inner peripheral wall on the circular inner peripheral wall of the first sidewall 4. The adaptors in FIG. 6 have four juts 8 for each adaptor unit. The jut 8 is effective for preventing the can from readily slipping out after receiving the can in the can-receiving socket. Juts 8 can exist in any number of adaptor units, and when a plurality of juts are present, they should preferably be spaced at equal intervals on the circular inner peripheral wall as shown in FIG. 6. Further, in case adaptors are combined and integrated by means of junctions 9, as illustrated in FIG. 6, the juts 8 should preferably be present in positions being spaced from junctions 9. The jut 8 may be offset linearly in the perpendicular direction to the base plate 1 on the inner peripheral wall of the first sidewall 4. In this case, preferably the jut 8 should stop halfway slightly before the surface of the base plate 1 without reaching it.

Figure 7:
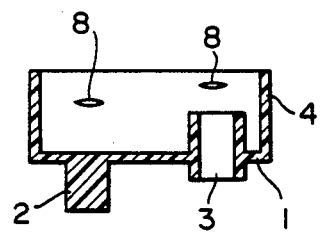
FIG. 7 is a cross-sectional view taken along line A—A of FIG. 6.

FIG. 7 is a cross-sectional view taken along a line A—A in FIG. 6. The juts 8 are illustrated in FIG. 7. At least one of those juts should preferably be situated at a different distance from the base plate surface 11 of the base plate 1 than the other juts. By so doing, it is possible to readily insert the can by exertion of less force as compared with the case where all juts are present at the same distance from the base plate.

By using the adaptors of the present invention, it is possible to assemble a selected multiple can configuration, connecting various beverage cans for juice and the like. Cans having the same outer diameter with various colors and patterns can be assembled in great varieties (particularly empty cans) and selected configurations can be assembled using the adaptors of the present invention. These configurations can be used for display purposes in retail stores.

Figure 8A:
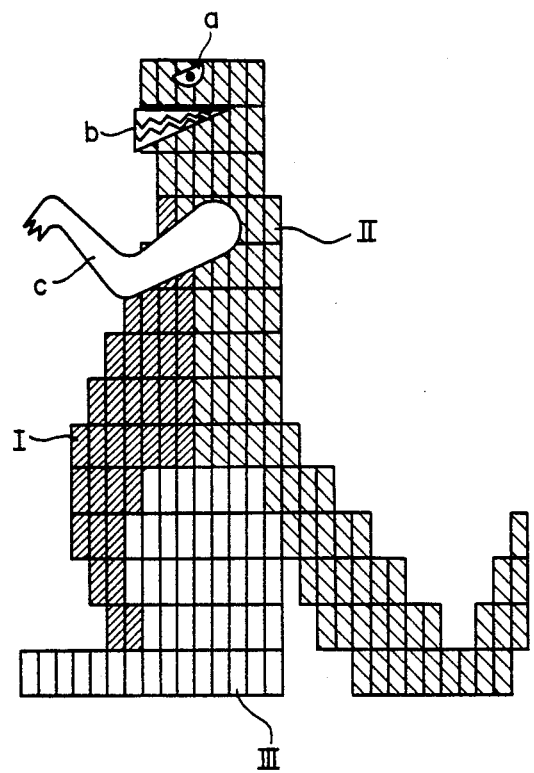
FIGS. 8a and 8b are left-side elevational and front views, respectively, of an exemplary configuration of a multiple can assembly of the present invention, such as a dinosaur.
Figure 8B:
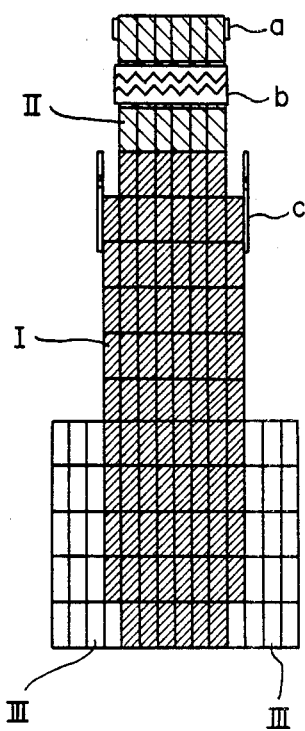

FIGS. 8a and 8b are schematic diagrams showing a selected configuration (dinosaur) for display assembled by using a combination of the adaptors of the present invention, namely: 352 pieces comprised of one adaptor unit; 219 pieces comprised of two adaptor units; and 352 pieces comprised of 6 adaptor units, and connecting 1166 juice cans of 3 kinds with a 250 ml capacity. In FIG. 8, part I is composed of cans which are mostly red, part II is composed of cans which are mostly green and part III is composed of cans which are mostly orange. Parts indicated by a, b and c are attachments such as eyes, teeth and arms.

It should be understood that the adaptors of the present invention may be modified as would occur to one of ordinary skill in the art without departing from the spirit and scope of the present invention.

What is claimed is:

1. Adaptors for removably assembling many cans in selected multiple can configurations, each of said adaptors comprising:
   a base plate;
   at least one projection extending from a first side of said base plate;
   at least one spacing member provided in the base plate and having a connector hole for receiving the projection of another aligned adaptor formed therein, said connector hole being defined by a tubular sleeve construction of said spacing member projecting a significant distance beyond the base plate surface to provide lateral support for said projection; and
   a skirt depending from a second side of said base plate forming a circular socket for receiving the top or bottom of a can therein, said spacing member defining a space between the base plate and the top or bottom of the can when the can is fully inserted within said circular socket.

2. Adaptors according to claim 1, wherein the circular socket is slightly tapered from the base plate towards the open end thereof, on the order of about 15 to 60 degrees outwardly from the perpendicular direction to the base plate.

3. Adaptors according to claim 1, wherein the inner peripheral surface of said circular socket is provided with at least one jut projecting from said surface, wherein said jut acts as a containing means for securing the can in the receiving socket.

4. Adaptors according to claim 3, in which a plurality of said juts exist and these juts are disposed at equal intervals on the inner peripheral surface.

5. Adaptors according to claim 3, wherein a plurality of said juts exist and at least one of these juts is offset at a different distance from the base plate than the other juts.

6. Adaptors according to claim 1, in which a second skirt having a lower height than that of said projection is provided on the base plate on the same side as said projection.

7. Adaptors according to claim 6, wherein said spacing member also extends from the base plate on the side of the projection member up to the height of said second skirt.

8. Adaptors according to claim 6, wherein the inner peripheral surface of said second skirt is tapered outwardly on the other of about 15 to 60 degrees from the perpendicular direction to the base plate.

9. Adaptors according to claim 1, wherein the end of said projection is tapered.

10. Adaptors in a combined form according to claim 1, which have the outer sides thereof permanently coupled together by means of junctions, wherein said adaptors are integrally formed together in groups of two or more.

11. Adaptors for removably assembling many cans in selected multiple can configurations, each of said adaptors comprising:
a base plate;
at least two projections extending from a first side of said base plate;
at least two spacing members provided in the base plate and having connector holes for receiving the projections of another aligned adaptor formed therein, said connector holes being defined by a tubular sleeve construction of said spacing members projecting a significant distance beyond the base plate surface to provide lateral support for said projections; and
a skirt depending from a second side of said base plate forming a circular socket for receiving the top or bottom of a can therein, said spacing members defining a space between the second side of said base plate and the top or bottom of the can when the can is fully inserted within said circular socket.

12. Adaptors according to claim 1, wherein the end of said connector hole defined by a tubular sleeve construction of said spacing member is tapered.

13. Adaptors according to claim 11, wherein the circular socket is slightly tapered from the base plate towards the open end thereof, on the order of about 15 to 60 degrees outwardly from the perpendicular direction to the base plate.

14. Adaptors according to claim 11, wherein the inner peripheral surface of said circular socket is provided with at least one jut projecting from said surface, wherein said jut acts as an additional retaining means for securing the can in the receiving socket.

15. Adaptors according to claim 14, in which a plurality of said juts exist and these juts are disposed at equal intervals on the inner peripheral surface.

16. Adaptors according to claim 14, wherein a plurality of said juts exist and at least one of these juts is offset at a different distance from the base plate than the other juts.

17. Adaptors according to claim 11, in which a second skirt having a lower height than that of said projection is provided on the base plate on the same side as the projection.

18. Adaptors according to claim 17, wherein said spacing members also extend from the base plate on the side of the projection members up to the height of said second skirt.

19. Adaptors according to claim 17, wherein the inner peripheral surface of said second skirt is tapered outwardly, on the order of about 15 to 60 degrees from the perpendicular direction of the base plate.

20. Adaptors according to claim 11, wherein the end of said projections are tapered.

21. Adaptors according to claim 11, wherein the ends of said connector holes defined by a tubular sleeve construction of said spacing members are tapered.

22. Adaptors in a combined form according to claim 11, which have the outer sides thereof permanently coupled together by means of junctions, wherein said adaptors are integrally formed together in groups of two or more.

* * * * *